United States Patent
Gay

(10) Patent No.: US 7,439,716 B2
(45) Date of Patent: Oct. 21, 2008

(54) DC-DC CONVERTER AND METHOD

(75) Inventor: Michael John Gay, Coppet Vaud (CH)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 247 days.

(21) Appl. No.: 11/530,983

(22) Filed: Sep. 12, 2006

(65) Prior Publication Data

US 2008/0062733 A1 Mar. 13, 2008

(51) Int. Cl.
*G05F 1/613* (2006.01)
(52) U.S. Cl. ...................................... 323/224
(58) Field of Classification Search ................. 323/224, 323/225, 283
See application file for complete search history.

(56) References Cited

U.S. PATENT DOCUMENTS 4,745,393 A * 5/1988 Tsukada et al. ............. 341/136
6,040,686 A 3/2000 Schenkel
6,998,825 B2 2/2006 Nagaoka et al.
7,002,817 B2 2/2006 Lipesei

* cited by examiner

*Primary Examiner*—Shawn Riley
(74) *Attorney, Agent, or Firm*—Rennie W. Dover

(57) ABSTRACT

A DC-DC converter and method for compensating for errors in the DC-DC converter. The DC-DC converter includes an inductor coupled for receiving a source of operating voltage through a plurality of switches. The switches are controlled by a control circuit that has first and second circuit paths that are substantially parallel to each other. Each circuit path is comprised of two switched capacitor comparators that are connected in series. The circuit paths function such that during one portion of a clock period one of the circuit paths operates in an error correction mode and the other circuit path operates in a normal mode. During a different portion of the clock period the operational modes of the circuit paths switch. This allows for a calibration interval in a sampled system in which at least one circuit path is always active and responsive to the input signals in a desired manner.

29 Claims, 6 Drawing Sheets

DC-DC CONVERTER AND METHOD

FIELD OF THE INVENTION

This invention relates, in general, to regulator circuits and, more particularly, to DC to DC converters.

BACKGROUND OF THE INVENTION

Battery operated devices such as mobile telephones, portable computers, calculators, cameras, Personal Digital Assistants (PDAs), video game controllers, etc. typically include DC-DC converters to produce a constant power supply voltage at the load. Although a constant voltage is provided at the load, the battery voltage decreases as the battery is discharged. These circuits include switches that alternate connecting an inductor between the battery and a load and between the load and ground using low-loss switches, which are usually operated at a fixed frequency. In other words, the circuits switch the connections such that during one part of the clock period the inductor is connected between the battery and a load and during another part of the clock period the switches connect the inductor between the load and ground. Alternatively, they can alternate connecting an inductor between the battery and ground and between the load and ground. The load is shunted by a large capacitor which absorbs the Alternating Current ("AC") components leaving a load voltage with low ripple.

DC-DC converters include a negative feedback loop which matches a portion of the load voltage to a reference voltage by modifying the duty cycle of the switches. Stabilizing the negative feedback loop is difficult because it includes an inductor and shunt capacitor and operates with a wide range of load currents. One technique for stabilizing the feedback loop includes designing the loop to have two series connected comparators, wherein the first comparator produces a current output in response to the load voltage error and the second comparator controls the duty cycle of the switches to adapt the peak inductor current to the output of the first comparator. This technique is called current mode control or current programmed control. During the intervals in which the inductor is connected across the load its current may reverse if the load current is too low. To prevent this from occurring a third comparator may be included in the feedback loop.

Contemporary circuits typically use Complementary Metal Oxide Semiconductor (CMOS) technology to manufacture the comparators. This technology provides comparators having low loss switches and that can be put into low power standby modes. However, they use many high valued resistors to limit the current of the controller circuits. In addition, manufacturing high valued resistors using CMOS technology consumes large areas of the semiconductor material. The use of large areas also introduces large stray capacitances, which are undesirable because they lower the switching speeds and increase power consumption of the CMOS devices.

Hence, a need exists for a DC-DC converter and a method of compensating for offset errors in a DC-DC converter. It would be advantageous for the DC-DC converter to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements, and in which.

DETAILED DESCRIPTION

Figure 1:
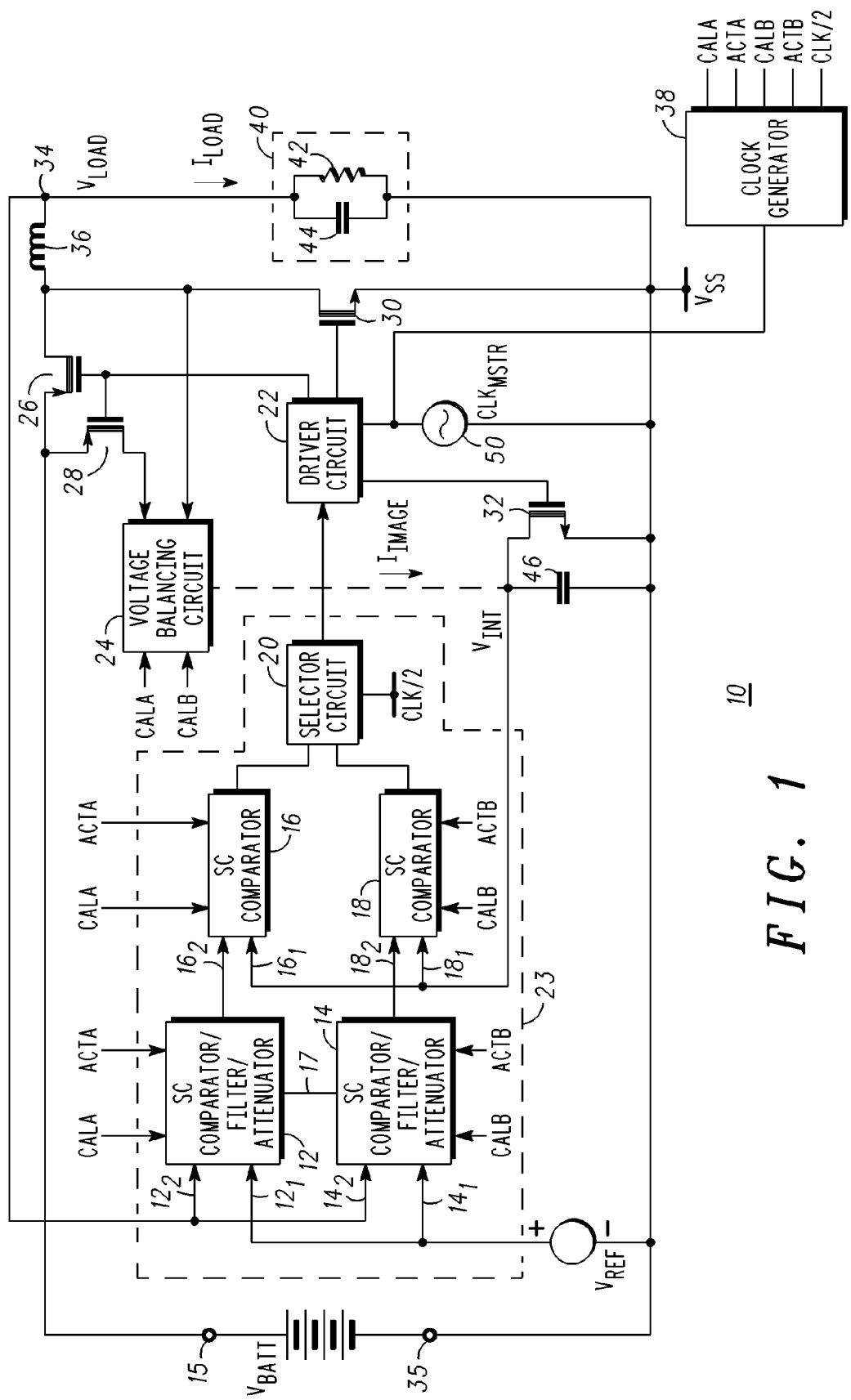
FIG. 1 is schematic diagram of a DC-DC converter in accordance with an embodiment of the present invention.

Generally, the present invention provides a switching Direct Current-Direct Current ("DC-DC") converter capable of receiving an input voltage $V_{BATT}$ from a battery and providing a regulated output voltage that has a lower voltage level. In accordance with one embodiment, the invention comprises a DC-DC converter that has an inductor having one terminal coupled for receiving an input power signal through a plurality of switches and the other terminal coupled to a load. The switches are repetitively operated at a desired clock frequency and have commutation instants that are responsive to signals derived from a control circuit. The control circuit has two circuit paths each made up of a plurality of circuit elements and adapts a load voltage to have a desired relationship to a reference voltage. The circuit paths are operated such that one or more of the circuit elements of either path may be temporarily switched into an error correction mode while the elements of the other path remain in a normal operating mode. This allows errors associated with the circuit elements to be cancelled without constraining the state of the switches. Preferably, the elements of a path operate in the error correction mode during a first part of a first clock period and in the normal mode during the remainder of the first clock period and all of the following or second clock period. The outputs from these circuit elements are selected during the second clock period. An advantage of this embodiment is that the effects of transient perturbations produced by the commutation from an error correction mode to a normal operating mode are substantially eliminated.

In accordance with another aspect each circuit path includes a voltage comparator that produces an output responsive to the difference between a portion of the load voltage and an applied reference voltage. The voltage comparators preferably include circuit elements that have filters adapted to dote the loops with dynamic properties. The filters are coupled to provide an output signal component that is common to both circuit paths and is obtained by integrating signals derived equally from the input signals to circuit elements of both of the comparators. In addition, each circuit path includes a second comparator that is responsive to the difference between an output signal from the voltage comparator and a signal indicative of the charge supplied to the load during the concurrent clock period. The output of the second comparators commutes the switches.

In accordance with another aspect, a voltage developed across a capacitor serves as a signal indicative of the charge supplied to the load. The capacitor is discharged at the start of each clock period and is charged by a current proportional to that flowing through an inductor.

In accordance with another aspect, a constant current is combined with the current that is proportional to the current flowing through the inductor to inhibit the circuit from oscillating. The constant current has a magnitude that is developed in accordance with the input and load voltages.

It should be noted that the term "configured" is used to describe the switch positions. Thus a switch may be configured to connect a switch terminal of the switch to another circuit element, i.e., the switch is closed, or a switch may be configured to disconnect the switch terminal from another circuit element, i.e., the switch is open.

FIG. 1 is a schematic diagram of a DC-DC converter 10 in accordance with an embodiment of the present invention. What is shown in FIG. 1 is a plurality of Switched Capacitor ("SC") comparators 12, 14, 16, and 18, a selector circuit 20, a driver circuit 22, and a voltage balancing circuit 24. SC comparators 12, 14, 16, and 18, selector circuit 20, and driver circuit 22 cooperate to form a control circuit 23. SC comparators 12 and 16 form part of a signal or circuit path and SC comparators 14 and 18 form part of a signal or circuit path. In addition, DC-DC converter 10 includes a plurality of transistors 26, 28, 30, and 32 and an integrating capacitor 46. More particularly, SC comparator 12 has an input $12_1$ coupled for receiving a reference voltage $V_{REF}$ and an input $12_2$ coupled to an output node 34, an input coupled for receiving a clock signal CALA, an input coupled for receiving a clock signal ACTA, and an output connected to an input $16_2$ of SC comparator 16. SC comparator 14 has an input $14_1$ coupled for receiving reference voltage $V_{REF}$, an input $14_2$ coupled to output node 34, an input coupled for receiving a clock signal CALB, an input coupled for receiving a clock signal ACTB, and an output connected to an input $18_2$ of SC comparator 18. Preferably, SC comparators 12 and 14 are matched to each other and include attenuation elements, comparator elements, and filter elements. SC comparators 12 and 14 are further described with reference to FIGS. 3 and 4. SC comparator 16 has an input $16_1$ coupled for receiving an input signal $V_{INT}$, an input coupled for receiving clock signal CALA, an input coupled for receiving clock signal ACTA, and an output connected to an input of selector circuit 20. SC comparator 18 has an input $18_1$ coupled for receiving an input signal $V_{INT}$, an input coupled for receiving clock signal CALB, an input coupled for receiving clock signal ACTB, and an output connected to another input of selector circuit 20.

Selector circuit 20 has an output connected to a driver circuit 22, an input connected to the output of SC comparator 16, an input connected to the output of SC comparator 18, and an input coupled for receiving a clock signal CLK/2. Clock signal CLK/2 has a frequency that is half of master clock signal $CLK_{MSTR}$ that is provided by master clock 50.

Driver circuit 22 has an input connected to the output of selector circuit 20, an output connected to the gates of transistors 26 and 28, an output connected to the gate of transistor 30, an output connected to the gate of transistor 32, and an input coupled for receiving master clock signal $CLK_{MSTR}$ from a master clock 50. In accordance with one embodiment, transistors 26 and 28 are P-channel Field Effect Transistors ("FETS") and transistors 30 and 32 are N-channel FETS. Each FET has a source, a drain, and a gate. The source and drain are also referred to as current carrying electrodes and the gate is also referred to as a control electrode. The drains of transistors 26 and 28 are connected to corresponding inputs of voltage balancing circuit 24. The source of transistor 26 is connected to the source of transistor 28 and the drain of transistor 26 is connected to the drain of transistor 30, to one input of voltage balancing circuit 24, and to output node 34 through an energy storage element 36. By way of example, energy storage element 36 is an inductor. The commonly connected sources of transistors 26 and 28 are coupled for receiving a source of operating potential such as, for example, a potential $V_{BATT}$. The source of transistor 30 is coupled for receiving a source of operating potential such as, for example, $V_{SS}$. By way of example, $V_{SS}$ is at a ground potential.

An output of voltage balancing circuit 24 is connected to the drain of transistor 32 and an output of driver circuit 22 is connected to the gate of transistor 32. Voltage balancing circuit 24 also has an input coupled for receiving clock signal CALA and an input coupled for receiving clock signal CALB. The source of transistor 32 is coupled for receiving a source of operating potential such as, for example, $V_{SS}$. An energy storage element 46 such as, for example, a capacitor, is coupled across transistor 32, i.e., one terminal of capacitor 46 is connected to the source of transistor 32 and one terminal of capacitor 46 is connected to the drain of transistor 32.

Clock signals CALA, ACTA, CALB, ACTB, and CLK/2 are generated by a clock generator 38 which is coupled for receiving master clock signal $CLK_{MSTR}$ from master clock 50.

A load 40 is coupled between output node 34 and a source of operating potential such as, for example, $V_{SS}$. By way of example, load 40 comprises a resistor 42 coupled in parallel with a capacitor 44.

In operation, a battery $V_{BATT}$ is coupled between supply terminal 15 and a reference terminal 35. More particularly, the positive terminal of battery $V_{BATT}$ is connected to the commonly connected sources of transistors 26 and 28 and the negative terminal is coupled for receiving a source of operating potential such as, for example, $V_{SS}$. By way of example, source of operating potential $V_{SS}$ is ground. SC comparators 12 and 14 are coupled for receiving a load voltage $V_{LOAD}$ and a reference voltage $V_{REF}$. Load voltage $V_{LOAD}$ is also referred to as a converter output signal. SC comparator 12 is coupled for receiving clock signals CALA and ACTA and SC comparator 14 is coupled for receiving clock signals CALB and ACTB. Master clock 50 transmits a master clock signal $CLK_{MSTR}$ to driver circuit 22 and to clock generator 38. In response to master clock signal $CLK_{MSTR}$ clock generator 38 generates clock signals CALA, ACTA, CALB, ACTB, and CLK/2. Clock signals CALA and CALB define error compensation intervals, whereas clock signals ACTA and ACTB serve as enable signals for SC comparators 12 and 14, respectively. Clock signals CALA, CALB, ACTA, and ACTB cooperate to place SC comparators 12 and 14 in states in which they are responsive to voltages $V_{LOAD}$ and $V_{REF}$. By way of example, SC comparators 12 and 14 are responsive to the logic high states of clock signals CALA, CALB, ACTA, and ACTB. Clock signal CLK/2 has half the frequency of master clock signal $CLK_{MSTR}$.

The filter elements of SC comparators 12 and 14 are coupled together through interconnect 17 so that their output signals have a common component that results from the integration of the combined input error signals. This allows the output signals of SC comparators 12 and 14 to settle at any part of their attainable range with negligible error between the attenuated, steady-state load voltage and the reference voltage. In accordance with the present embodiment, SC comparators 12 and 14 are inverting so that they generate an increasing output voltage when the attenuated load voltage is below the reference voltage.

Figure 2:
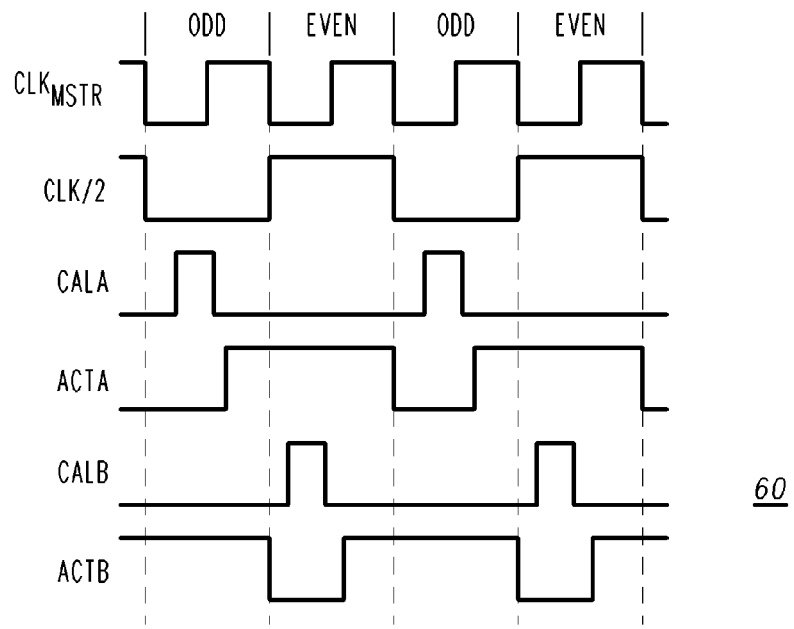
FIG. 2 is a timing diagram for use with the DC-DC converter of FIG. 1.

Referring now to FIG. 2, a timing diagram 60 for clock signals CALA, ACTA, CALB, ACTB, CLK/2, and master clock $CLK_{MSTR}$ is shown. Clock signals CALA, ACTA, CALB, ACTB, and CLK/2 are generated by clock generator 38 which is coupled for receiving master clock signal $CLK_{MSTR}$ from master clock 50. In accordance with the examples shown in timing diagram 60, master clock 50 has a clock period of 0.2 microseconds (μs). Thus clock signal CLK/2 has a period of 0.4 μs. Clock signal CALA is high for intervals during the first part of one set of alternate clock periods and clock signal CALB is high for intervals during the first part of the other set of alternate clock periods. The part of the set of clock periods during which clock signal CALA is high is referred to as the odd period and the part of the set of clock period during which clock signal CALB is high is referred to as the even period. Clock signal ACTA is high for intervals during the odd periods after clock signal CALA returns to zero and extending to the end of the following even period. Likewise, clock signal ACTB is high for intervals during the even periods after clock signal CALB returns to zero and extending to the end of the following odd period. Clock signal CLK/2 is high during the even periods.

Reference voltage $V_{REF}$ is applied to inputs 12$_1$ and 14$_1$ and load voltage $V_{LOAD}$ is fed back to inputs 12$_2$ and 14$_2$ from output node 34. Inputs 16$_1$ and 18$_1$ are coupled for receiving a voltage $V_{INT}$ that appears across capacitor 46. Voltage $V_{INT}$ is also referred to as an internal reference signal. Comparators 12 and 16 receive the same clock signals, i.e., clock signals CALA and ACTA, and comparators 14 and 18 receive the same clock signals, i.e., clock signals CALB and ACTB. SC comparators 12 and 14 attenuate the load voltage $V_{LOAD}$ that is fed back from node 34, function as zero-offset comparators to compare the attenuated signal with reference voltage $V_{REF}$, and filter the comparison signal to generate filter output signals that are transmitted to SC comparators 16 and 18, respectively. SC comparators 12 and 14, which are responsive to a difference between a portion of load voltage $V_{LOAD}$ and reference voltage $V_{REF}$, filter the input signal $V_{REF}$ and the feedback signal to generate integrated output signals. The output signals of SC comparators 12 and 14 are also referred to as control path signals or sub-signals. More particularly, SC comparator 12 attenuates and filters converter output or load signal $V_{LOAD}$ and reference signal $V_{REF}$ then compares the attenuated and filtered load signal with the attenuated and filtered reference signal and introduces an offset error correction signal to generate a sub-signal from SC comparator 12. Likewise, SC comparator 14 attenuates and filters converter output or load signal $V_{LOAD}$ and reference signal $V_{REF}$ then compares the attenuated and filtered load signal with the attenuated and filtered reference signal and introduces an offset error correction signal to generate a sub-signal from SC comparator 14. Thus, SC comparators 12 and 14 produce an output responsive to a difference between a portion load voltage $V_{LOAD}$ and reference voltage $V_{REF}$.

SC comparators 16 and 18 serve as a second set of zero-offset comparators that compare the output signals from SC comparators 12 and 14, i.e., the sub-signals, with voltage $V_{INT}$, i.e., the voltage developed across capacitor 46. In addition to comparing the sub-signals, SC comparators 16 and 18 introduce offset error correction signals into the signals. Thus, comparator 16 compares the sub-signal from SC comparator 12, introduces an offset error correction signal, and outputs a sub-signal. Similarly, comparator 18 compares the sub-signal from SC comparator 14, introduces an offset error correction signal, and outputs a sub-signal. The combination of the sub-signals from SC comparators 12 and 16 form a path signal and the combination of sub-signals from SC comparators 14 and 18 form another path signal.

Selector circuit 20 is clocked to select between the signal path of SC comparators 12 and 16 or the signal path of SC comparators 14 and 18 to generate an output signal that is a selected path signal.

At the start of each clock period, capacitor 46 is discharged in response to a short pulse produced by driver circuit 22. After being discharged, capacitor 46 is charged by an image of the current flowing through transistor 26. Voltage balancing circuit 24 uses the current flowing through transistor 28 to generate the image current $I_{IMAGE}$, which is typically much smaller than the current flowing through transistor 28 and proportional to the current flowing through inductor 36. Thus, driver circuit 22 generates a driver signal to create image current $I_{IMAGE}$ which is an image of the current flowing through transistor 28. Voltage balancing circuit 24 ensures that the current flowing through transistor 28 matches the current flowing through transistor 26 by closely matching the voltages at the drains of transistors 26 and 28 during their conduction intervals. Thus, the voltage across capacitor 46 serves as a signal indicative of the charge supplied to a load during a concurrent clock period. In addition to discharging capacitor 46 at the start of each clock period, driver circuit 22 is switched to apply logic low voltages to the gates of transistors 26, 28, and 30.

In response to an output signal from selector circuit 20, driver circuit 22 changes or commutes the voltages appearing at its outputs. Thus, the voltages at the gates of transistors 26, 28, and 30 change from logic low voltage levels to logic high voltage levels, thereby turning off transistors 26 and 28 and turning on transistor 30. Accordingly, transistor 26 conducts current between the start of each clock period and the commutation instant and transistor 30 conducts current from the commutation instant until the end of the clock period. Driver circuit 22 includes a means for prohibiting the simultaneous conduction of transistors 26 and 30 and a means to provide a short pulse to the gate of transistor 32 at the start of each clock period, which short pulse discharges capacitor 46.

The output signals of comparators 16 and 18 are alternately selected by selector circuit 20 in response to clock signal CLK/2. Thus, the output signal of selector circuit 20 is also referred to as a selected signal. The output signal from comparator 16 is selected during the even clock periods, during which time clock signal ACTA remains high and the output from comparator 18 is selected during the odd clock periods during which time clock signal ACTB remains high. The switching transients produced by comparators 12 and 16 decay during the portions of the odd clock periods in which the clock signal ACTA is high. Likewise, the switching transients produced by comparators 14 and 18 decay during the portions of the even clock periods in which the clock signal ACTB is high. Hence, the output from selector circuit 20 is responsive to voltages $V_{LOAD}$, $V_{REF}$, and $V_{INT}$ at all times, is independent of offset errors in the circuits, and is free of transient perturbations.

Assuming that input voltage $V_{BATT}$, load voltage $V_{LOAD}$, and load current $I_{LOAD}$ are selected so that inductor 36 does not reverse its direction of current conduction and that DC-DC converter 10 is stable, i.e., voltage $V_{LOAD}$ is less than half of battery voltage $V_{BATT}$, capacitor 46 will be charged from zero voltage at the start of each clock cycle by an image of the current flowing through inductor 36 that is transmitted from transistor 26 under steady-state conditions. Capacitor 46 will be charged to a voltage matching the output voltage of SC comparator 12, at which point SC comparator 16 applies a signal to driver circuit 22 which renders transistor 26 nonconductive and transistor 30 conductive to maintain the current flowing in inductor 36.

The total charge transferred to the load is proportional to that supplied by transistor 26 and increases monotonically with the fraction of the clock period for which transistor 26 remains on and conducting current. Under steady-state conditions, the commutation of transistor 26 being conductive to transistor 30 becoming conductive occurs at the portion of each clock period during which the charge supplied to the load matches the charge that maintains a constant load voltage $V_{LOAD}$. Because integrating capacitor 46 receives an image of the current flowing in transistor 26, it receives an image of the total charge supplied by transistor 26 during its conduction intervals. Therefore, under steady-state conditions the output voltages of SC comparators 12 and 14 are proportional to the charge supplied to the load per clock period and therefore proportional to load current $I_{LOAD}$. This linearity is an advantage of DC-DC converters configured in accordance with the present invention. Another advantage is that the output voltages of SC comparators 12 and 14 are stable when the attenuated load voltage $V_{LOAD}$ matches reference voltage $V_{REF}$ because they include integrating filters. Thus, the DC-DC converter 10 settles to a well-defined load voltage $V_{LOAD}$, irrespective of the load current $I_{LOAD}$.

With respect to the dynamic behavior, an increase in, for example, load current $I_{LOAD}$ produces a transient reduction in load voltage $V_{LOAD}$, which causes the output voltages of SC comparators 12 and 14 to increase. Integrating capacitor 46 charges to a higher voltage before switches 26 and 30 commute resulting in a higher current being supplied to load 40. The circuit stabilizes with an unchanged load voltage $V_{LOAD}$ but at a higher output voltage from SC comparators 12 and 14 and increased conduction periods for transistor 26. Similarly, load current $I_{LOAD}$, which produces a transient increase in load voltage $V_{LOAD}$, causes the output voltages of SC comparators 12 and 14 to decrease. Integrating capacitor 46 charges to a lower voltage before switches 26 and 30 commute resulting in a lower current being supplied to load 40. The circuit stabilizes with an unchanged load voltage $V_{LOAD}$ but at a lower output voltage from SC comparators 12 and 14 and decreased conduction periods for transistor 26.

Figure 3:
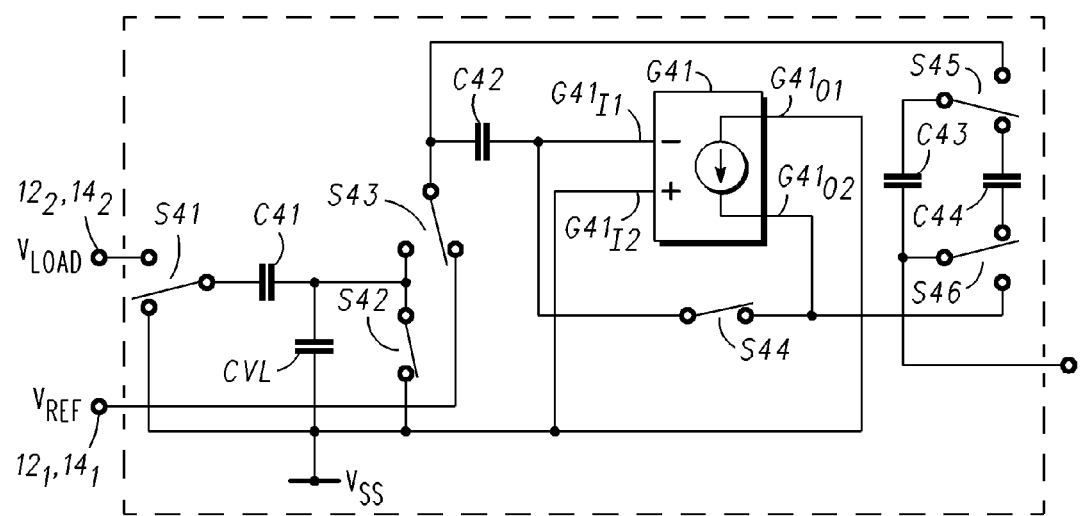
FIG. 3 is a schematic diagram of a portion of the DC-DC converter of FIG. 1 configured to operate in an offset correction operating mode.

FIG. 3 is a schematic diagram of SC comparators 12 and 14 in accordance with an embodiment of the present invention and configured to operate in an offset correction mode. Although SC comparators 12 and 14 are preferably structurally the same, their input terminals $12_1$, $12_2$, $14_1$, and $14_2$ have been identified by different reference characters because they are separate elements of DC-DC converter 10 shown in FIG. 1. What is shown in FIG. 3 is a three-terminal switch S41 having a terminal that serves as input $12_2$, $14_2$, a terminal coupled for receiving a source of operating potential such as, for example, $V_{SS}$, and a terminal coupled to one terminal of a capacitor C41. The other terminal of capacitor C41 is coupled to a terminal of a capacitor CVL, a terminal of a two-terminal switch S42, and a first terminal of a three terminal switch S43. The other terminal of capacitor CVL is coupled for receiving a source of operating potential such as, for example, $V_{SS}$. The second terminal of three-terminal switch S43 serves as input $12_1$ or $14_1$ of SC comparators 12 and 14, respectively, and the third terminal of switch S43 is coupled to one terminal of a capacitor C42 and to the first terminal of a three-terminal switch S45. The second terminal of capacitor C42 is coupled to an inverting input $G41_{I1}$ of a transconductor G41 and to one terminal of a two-terminal switch S44. Transconductor G41 also has a non-inverting input $G41_{I2}$ coupled for receiving the source of operating potential $V_{SS}$, an output $G41_{O1}$ coupled for receiving a source of operating potential such as, for example, $V_{SS}$ and an output $G41_{O2}$ connected to the second terminal of switch S44 and to the first terminal of three-terminal terminal switch S46. The third terminal of three-terminal switch S46 is coupled to the third terminal of three-terminal switch S45 through a capacitor C43. The second terminal of switch S45 is coupled to the second terminal of switch S46 through a capacitor C44. The commonly connected terminal of capacitor C43 and the third terminal of switch S46 serves as an output of SC comparators 12 and 14. Although element G41 is shown and described as being a transconductor, this is not a limitation of the present invention. Transconductor G41 may be an inverter, a comparator, etc. Likewise, switches S41, S42, S43, S44, S45, and S46 may be Metal Oxide Semiconductor Field Effect Transistors (MOSFETs), transmission gates, or the like. It should be noted that SC comparator 12 and SC comparator 14 each have a capacitor C44 and these capacitors are coupled together in parallel. Thus, SC comparator 12 and SC comparator 14 are coupled together through capacitors C44. This connection is represented in FIG. 1 by interconnect 17.

Figure 4:
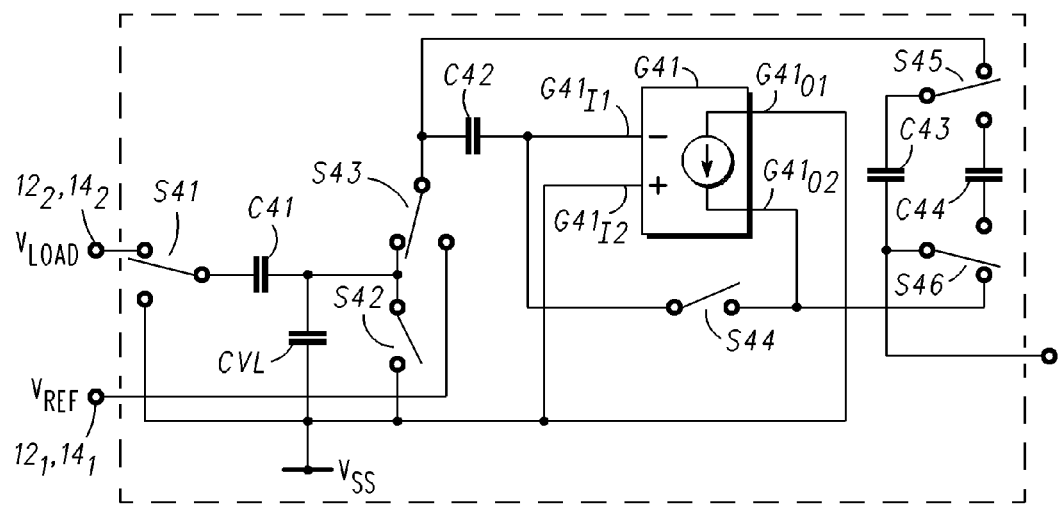
FIG. 4 is a schematic diagram of the portion of the DC-DC converter of FIG. 3 configured to operate in a normal operating mode.

FIG. 4 is a schematic diagram of SC comparators 12 and 14 shown in FIG. 3 configured to operate in an active mode. In other words, the circuit architecture of FIG. 4 is the same as that of FIG. 3 except that switches S41, S42, S43, S44, S45, and S46 are in different positions.

The positions of switches S41, S42, S43, S44, S45, and S46 are set by clock input signals CALA and ACTA for SC comparator 12 and by clock input signals CALB and ACTB for SC comparator 14. By way of example, SC comparator 12 operates in the offset correction mode while clock input signal CALA is in a logic high state and SC comparator 14 operates in the offset correction mode while clock input signal CALB is in a logic high state. Similarly, SC comparator 12 operates in the active mode while clock input signal ACTA is in a logic high state and SC comparator 14 operates in the active mode while clock input signal ACTB is in a logic high state.

Referring again to FIG. 3, SC comparator 12 operates in the offset correction mode when clock input signal CALA is in a logic high state and SC comparator 14 operates in the offset correction mode when clock input signal CALB is in a logic high state. In this mode, switches S41 and S42 are configured so the terminals of capacitor C41 are coupled for receiving a source of operating potential such as, for example, $V_{SS}$. Switch S43 is configured so that one terminal of capacitor C42 is connected to input $12_1$, $14_1$ and switch S44 is configured so that the other terminal of capacitor C42 is connected to output $G41_{O2}$ of transconductor G41. Switches S45 and S46 are configured so that capacitors C43 and C44 are connected in parallel. In this configuration, switches S41, S42, and S44 are set to discharge capacitors C41 and CVL. In addition, capacitor C43 is disconnected from output $G41_{O2}$ of transconductor G41 and connected in parallel with the pair of integrating capacitors C44. It should be noted that capacitor 44 is referred to in the plural sense because it refers to capacitors 44 that are present in SC comparators 12 and 14. Input coupling capacitor C42 is coupled for receiving reference voltage $V_{REF}$, it is charged to the difference between reference voltage $V_{REF}$ and the voltage at inverting input $G41_{I1}$ of transconductor G41 to adjust its output current to zero. The charge stored in capacitor C43 in the precedent active mode will be integrated with that stored on capacitors C44.

As discussed hereinbefore, SC comparator 12 operates in the active mode when clock input signal ACTA is in a logic high state and SC comparator 14 operates in the active mode when clock signal ACTB is in a logic high state. In this mode, switches S41, S42, and S45 are configured so that one terminal of capacitor C41 is coupled for receiving load voltage $V_{LOAD}$ and the other terminal of capacitor C41 is connected to capacitors CVL, C42, and C43. Switch S46 is configured so that the other terminal of capacitor C43 is connected to output $G41_{O2}$ of transconductor G41. Switch S44 is configured so that capacitor C42 is disconnected from output $G41_{O2}$. In this mode, the output current of transconductor G41 will remain at zero if the voltage applied to the first terminal of capacitor C42 remains equal to reference voltage $V_{REF}$. In accordance with the rule of charge conservation, this condition is satisfied when:

$$V_{LOAD} = (1 + C_{CVL}/C_{C41}) * V_{REF} \qquad \text{EQT. 1}$$

where:

$C_{C41}$ equals the capacitance of capacitor C41; and
$C_{CVL}$ equals the capacitance of capacitor CVL.

If the output voltage of DC-DC converter 10 differs from the value given by EQT. 1, some charge will be transferred from capacitor C41 in each active period. If the transconductance of transconductor G41 is adequate, this charge will be supplied by feedback capacitor C43, modifying its voltage from the integrated value established in the precedent offset correction mode.

Figure 5:
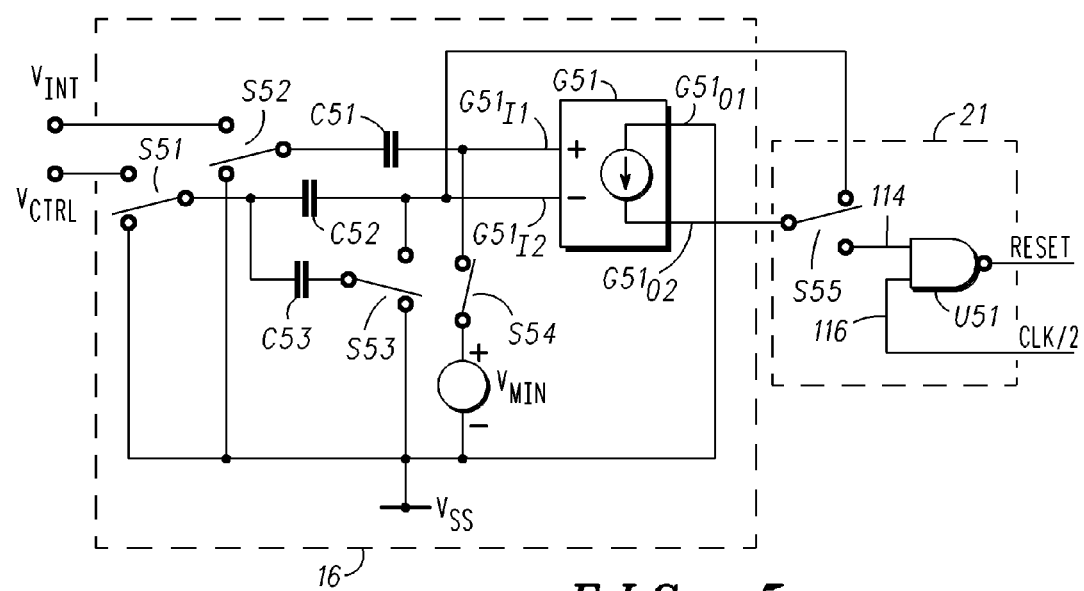
FIG. 5 is a schematic diagram of another portion of the DC-DC converter of FIG. 3 configured to operate in an offset correction operating mode.

FIG. 5 is a schematic diagram of SC comparator 16 and a portion 21 of selector circuit 20 configured to operate in an offset compensation mode in accordance with an embodiment of the present invention. The offset compensation mode is also referred to as an error correction mode. What is shown in FIG. 5 is a three-terminal switch S52 having a first terminal coupled for receiving an input voltage $V_{INT}$, a second terminal coupled for receiving a source of operating potential such as, for example, $V_{SS}$, and a third terminal coupled to one terminal of a capacitor C51. The other terminal of capacitor C51 is coupled to a non-inverting input $G51_{I1}$ of a balanced input transconductor G51 and to a first terminal of a two-terminal switch S54. The other terminal of two-terminal switch S54 is coupled for receiving a source of potential $V_{MIN}$. Balanced input transconductor G51 has an inverting input $G51_{I2}$ coupled to a first terminal of a three-terminal switch S53 and to a first terminal of a capacitor C52. The second terminal of three-terminal switch S53 is coupled for receiving a source of operating potential such as, for example, $V_{SS}$. The third terminal of three-terminal switch S53 is connected to one terminal of a capacitor C53 and the other terminal of capacitor C53 is commonly connected to the second terminal of capacitor C52. The commonly connected terminals of capacitors C52 and C53 are connected to the third terminal of a three-terminal switch S51. The first terminal of three-terminal switch S51 is coupled for receiving a control voltage $V_{CTRL}$ and the second terminal of three-terminal switch S51 is coupled for receiving a source of operating potential such as, for example, $V_{SS}$. SC comparator 16 comprises switches S51, S52, S53, and S54, capacitors C51 and C52, and balanced input transconductor G51. Although element G51 is shown and described as being a transconductor, this is not a limitation of the present invention. Transconductor G51 may be an inverter, a comparator, etc. Likewise, switches S51, S52, S53, S54, and S55 may be Metal Oxide Semiconductor Field Effect Transistors (MOSFETs), transmission gates, or the like.

Portion 21 of selector circuit 20 that is shown in FIG. 5 is a three-terminal switch S55, having a first terminal connected to inverting input $G51_{I2}$ of balanced input transconductor G51, a second terminal connected to an input 114 of a two-input NAND gate U51, and a third terminal connected to output $G51_{O2}$ of balanced input transconductor G51. Input 116 of two-input NAND gate U51 is coupled for receiving clock signal CLK/2. Balanced input transconductor G51 also has a second output $G51_{O1}$ coupled for receiving a source of operating potential such as, for example, $V_{SS}$.

Figure 6:
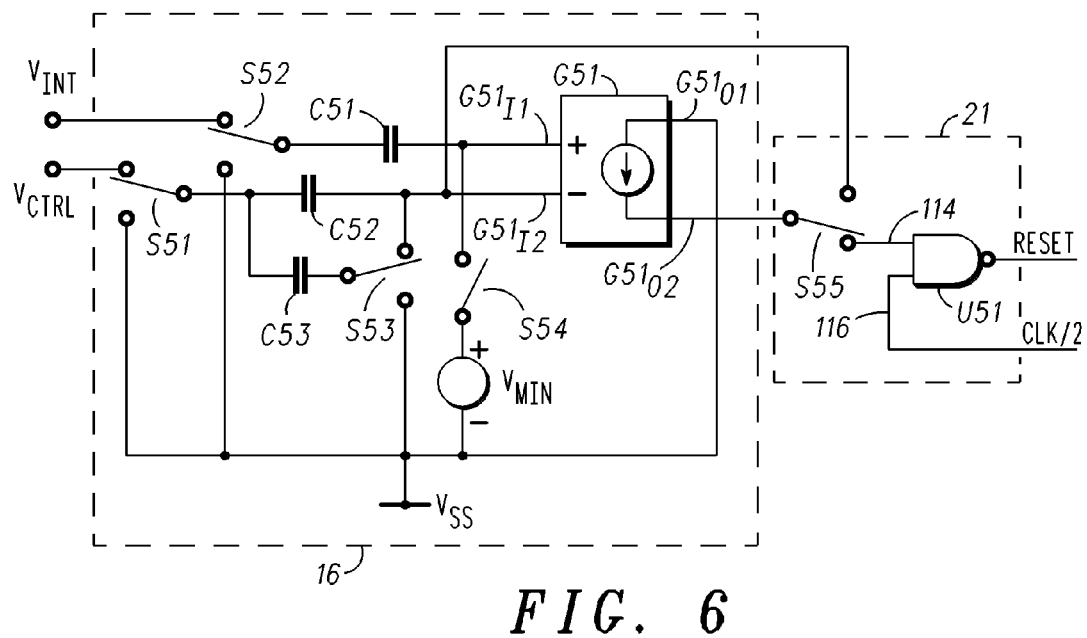
FIG. 6 is a schematic diagram of the portion of the DC-DC converter of FIG. 5 configured to operate in a normal operating mode.

FIG. 6 is a schematic diagram of SC comparator 16 and portion 21 of selector circuit 20 shown in FIG. 5 configured to operate in an active mode. In other words, the circuit architecture of FIG. 6 is the same as that of FIG. 5 except that switches S51, S52, S53, S54, and S55 are in different positions.

The positions of switches S51, S52, S53, S54, and S55 are set by clock input signals CALA and ACTA. In particular, SC comparator 16 operates in the offset correction mode while clock input signal CALA is in a logic high state and in an active mode while clock input signal ACTA is in a logic high state.

In the offset correction mode, switches S52 and S54 are configured so that one terminal of capacitor C51 is coupled for receiving source of operating potential $V_{SS}$, and input $G51_{I1}$ is coupled for receiving voltage $V_{MIN}$. Switches S53 and S51 are configured so that the terminals of capacitor C53 are coupled for receiving the same potential such as, for example, $V_{SS}$. In addition, the configuration of switches S54 and S52 couple one terminal of capacitor C51 to source of operating potential $V_{SS}$ and the other terminal of capacitor C51 to voltage $V_{MIN}$. Switches S51 and S55 are configured to connect one terminal of capacitor C52 for receiving source of operating potential $V_{SS}$ and the other terminal of capacitor C52 and input $G51_{I2}$ to output $G51_{O2}$ of transconductor G51. Thus transconductor G51 is configured in a negative feedback configuration. Because of the negative feedback configuration and non-inverting input G51 being coupled to receive voltage $V_{MIN}$, a similar voltage is established at inverting input $G51_{I2}$. Preferably, voltage $V_{MIN}$ is selected to be a value within the operating range of transconductor G51. Capacitor C51 is charged to voltage $V_{MIN}$ and capacitor C52 is charged to voltage $V_{MIN}$ modified by any offset voltage of transconductor G51. Capacitor C53 is discharged and the transconductor output current settles to zero.

In the active mode, capacitor C53, which was discharged, is connected in parallel across capacitor C52 so that voltage stored on the combination is offset from the initial voltage which was such as to reduce the output signal of transconductor G51 to zero. The offset allows the voltage comparator and filter portions of SC comparator 12 to operate with an output voltage range that does not extend to zero. Because input 116 of two-input NAND gate U51 is coupled for receiving clock signal CLK/2 (shown in FIG. 1), the output of two-input NAND gate U51 is responsive to the output of transconductor G51 only while clock signal CLK/2 is high. Integrating capacitor 46 (shown in FIG. 1) is discharged by transistor 32 at each transition of clock signal CLK/2, so two-input NAND gate U51 switches to a logic low voltage level after the transition of clock signal CLK/2, when image current $I_{IMAGE}$ supplied by voltage balance circuit 24 has charged capacitor 46 to a voltage equal to approximately $V_{CTRL}$ less the offset voltage. Thus, image current $I_{IMAGE}$ is used to generate internal reference signal $V_{INT}$.

Although SC comparator 18 and the corresponding portion of selector circuit 20 have not been shown, it should be noted that the circuit configuration of SC comparator 18 is the same as the portion of FIG. 5 representing SC comparator 16. Portion 21 of selector circuit 20 coupled to SC comparator 18 differs from portion 21 of selector circuit 20 coupled to SC comparator 16 by the addition of an inverter coupled between input terminal 116 and clock signal CLK/2. It should be further noted that for SC comparator 18, the offset correction mode is established while clock input signal CALA is high and the active mode is established while clock input signal ACTA is high.

Figure 7:
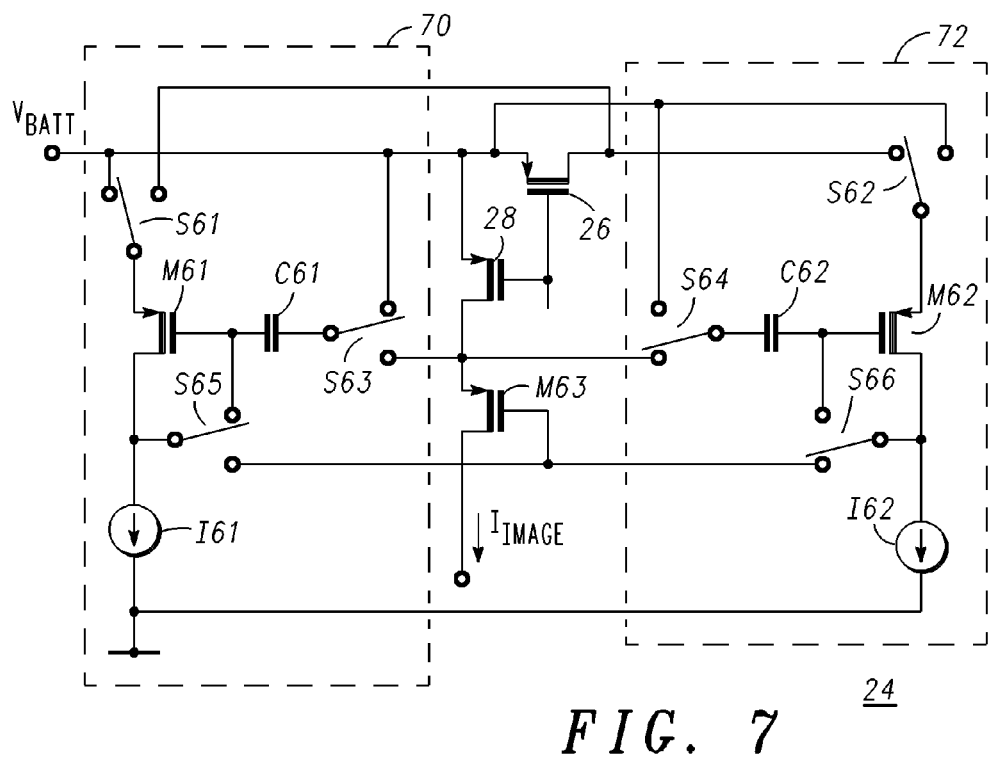
FIG. 7 is a schematic diagram of another portion of the DC-DC converter of FIG. 1.

Referring now to FIG. 7 a schematic diagram of voltage balancing circuit 24 in accordance with an embodiment of the present invention is illustrated. Voltage balancing circuit 24 comprises subcircuits 70 and 72. Subcircuit 70 comprises three three-terminal switches S61, S63, and S65, a P-channel FET M61, a current sink I61, and a capacitor C61. Subcircuit 72 comprises three three-terminal switches S62, S64, and S66, P-channel FET M62, a current sink I62, and a capacitor C62. Referring again to sub-circuit 70, three-terminal switch S61 has a first input terminal connected to the sources of transistors 26 and 28 (the connections of transistors 26 and 28 have been described with reference to FIG. 1) and for receiving an input voltage $V_{BATT}$, a second terminal connected to the drain of transistor 26 and the first terminal of switch S62, and a third terminal connected to the source of P-channel FET M61. The gate of P-channel FET M61 is connected to the first terminal of three-terminal switch S65 and to one terminal of capacitor C61 and the drain of P-channel FET M61 is connected to the third terminal of three-terminal switch S65 and to current sink I61. The other terminal of capacitor C61 is connected to the third terminal of three-terminal switch S63. The first terminal of three-terminal switch S63 is connected to the sources of transistors 26 and 28 and for receiving voltage $V_{BATT}$ and the second terminal of three-terminal switch S63 is connected to the drain of P-channel transistor 28, to the source of a P-channel FET M63, and to the first terminal of switch S64. The drain of P-channel FET M63 is coupled to parts of DC-DC converter 10 that use image current $I_{IMAGE}$ and the gate of P-channel FET M63 is connected to the second terminals of switches S65 and S66. It should be noted that P-channel FET M63 may be replaced by a plurality of P-channel transistors having their gates connected in common and their sources connected in common to divide image current $I_{IMAGE}$ into a desired number of fractional components for use in different sections of DC-DC converter 10.

Three-terminal switch S62 has a first terminal connected to the drain of transistor 26, a second terminal connected to the sources of transistors 26 and 28 and for receiving a voltage $V_{BATT}$, and a third terminal connected to the source of P-channel FET M62. The gate of P-channel FET M62 is connected to the second terminal of three-terminal switch S66 and coupled to the third terminal of three-terminal switch S64 through a capacitor C62, and the drain of P-channel FET M62 is connected to the third terminal of three-terminal switch S66 and to current sink I62. The first terminal of three-terminal switch S64 is connected to the sources of transistors 26 and 28 and for receiving voltage $V_{BATT}$ and the second terminal of three-terminal switch S64 is connected to the drain of P-channel transistor 28, to the source of a P-channel FET M63, and to the second terminal of switch S63.

In operation, voltage balancing circuit 24 transfers the current sourced by transistor 28 to other parts of DC-DC converter 10, while ensuring that the drain-to-source voltage of transistor 28 matches that of transistor 26. Sub-circuits 70 and 72 operate in offset correction and active modes. One sub-circuit is switched to the offset correction mode while clock input signal CALA is high and the other sub-circuit is switched to the offset correction mode while clock input signal CALB is high. In the active mode, sub-circuits 70 and 72 operate in parallel.

In the embodiment shown in FIG. 7, sub-circuit 70 is configured to operate in the offset correction mode and referring to sub-circuit 72, capacitor C62 is charged to the gate-to-source voltage required for P-channel FET M62 to source the current sunk by current sink I62. A negative feedback loop comprising FET M61, switches S61, S63, and S65, and capacitor C61 is created that forces P-channel FET M61 to source the current sunk by current sink I61. Capacitor C61 is charged to the gate-to-source voltage so that transistor M61 can source the current. This voltage is retained in the active mode as the first terminal of capacitor C61 is connected to the gate of P-channel FET M61, which does not provide a conductive path. P-channel FET M62 will source the current provided that the voltage at the drains of transistors 26 and 28 are substantially equal. The negative feedback loop comprising FETS M62 and M63, switches S66 and S64, and capacitor C41 adapts the gate voltage of P-channel FET M63 to establish this condition. Thus, the drain voltages of transistors 26 and 28 are held equal, while P-channel FET M63 passes the current sourced by transistor 28 to the other sections of DC-DC converter 10.

Figure 8:
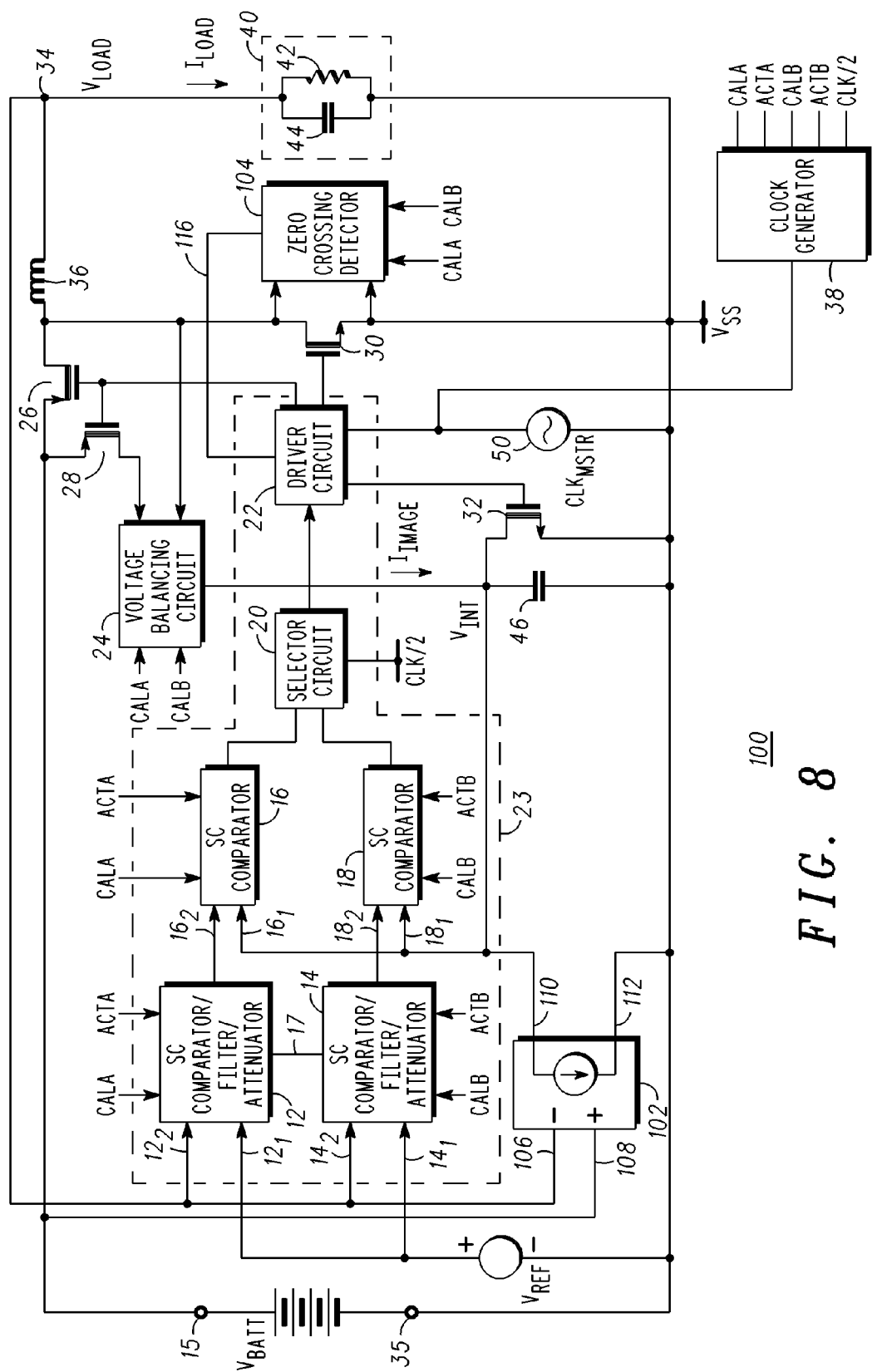
FIG. 8 is a schematic diagram of a DC-DC converter in accordance with another embodiment of the present invention.

FIG. 8 is a schematic diagram of a DC-DC converter 100 in accordance with another embodiment of the present invention. DC-DC converter 100 differs from DC-DC converter 10 of FIG. 1 by the addition of a current generator 102 coupled across capacitor 46 and a zero-crossing detector 104 coupled between the drain and source of N-channel FET 30. Current generator 102 has an input 106 connected to node 34, an input 108 connected to the sources of transistors 26 and 28 and to voltage source $V_{BATT}$, an output 110 connected to one terminal of capacitor 46, and an output 112 coupled to the other terminal of capacitor 46. Thus, output 110 is connected to inputs of SC comparators 16 and 18.

Zero-crossing detector 104 has an input connected to the drain of N-channel FET 30, an input connected to the source of N-channel FET 30, and an output 116 connected to driver circuit 22. In addition, zero-crossing detector 104 has inputs coupled for receiving clock input signals CALA and CALB.

In operation, when the current through inductor 36 is commuted to flow through transistor 30, the drain-to-source voltage initially will be negative. If the current flowing through inductor 36 reverses, the drain-to-source voltage of transistor 30 falls to zero and becomes positive. Zero-crossing detector 104 monitors the drain-to-source voltage of transistor 30 and transmits a signal to the driver to remove the voltage at the gate of transistor 30 as its gate-to-source voltage approaches zero. Because the drain-to-source voltage is ideally zero and very small in practice, it is desirable for zero-crossing detector 104 to have a low offset and be capable of acting at any time during the clock period. Since transistor 30 can conduct for the full clock period, two comparators are used, one being error-corrected during odd clock periods and one being error-corrected during even clock periods. During the non-error-correcting intervals the comparators can be connected in parallel. Thus, while input clock signal CALA is high one comparator is disconnected and error-corrected and while input clock signal CALB is high the other comparator is disconnected and error corrected. The combination of the two comparators is always responsive to the drain-to-source voltage of transistor 30 because input clock signals CALA and CALB are non-overlapping and shorter than a clock period.

In addition, DC-DC converter 100 may become unstable with low loads when the load voltage is greater than half the battery voltage. This instability can be inhibited by adding a current to that which charges integrating capacitor 46. The additional current can be provided by current generator 102. The additional current is given as:

$$I = ((VLOAD^2)*T)/V_{BATT}*M*L) \qquad \text{EQT. 2}$$

where:

L equals the value of the inductor (Henry's);

T is the clock period (seconds); and

M is the ratio of the current flowing in transistor 26 to the current that charges capacitor 46.

Figure 9:
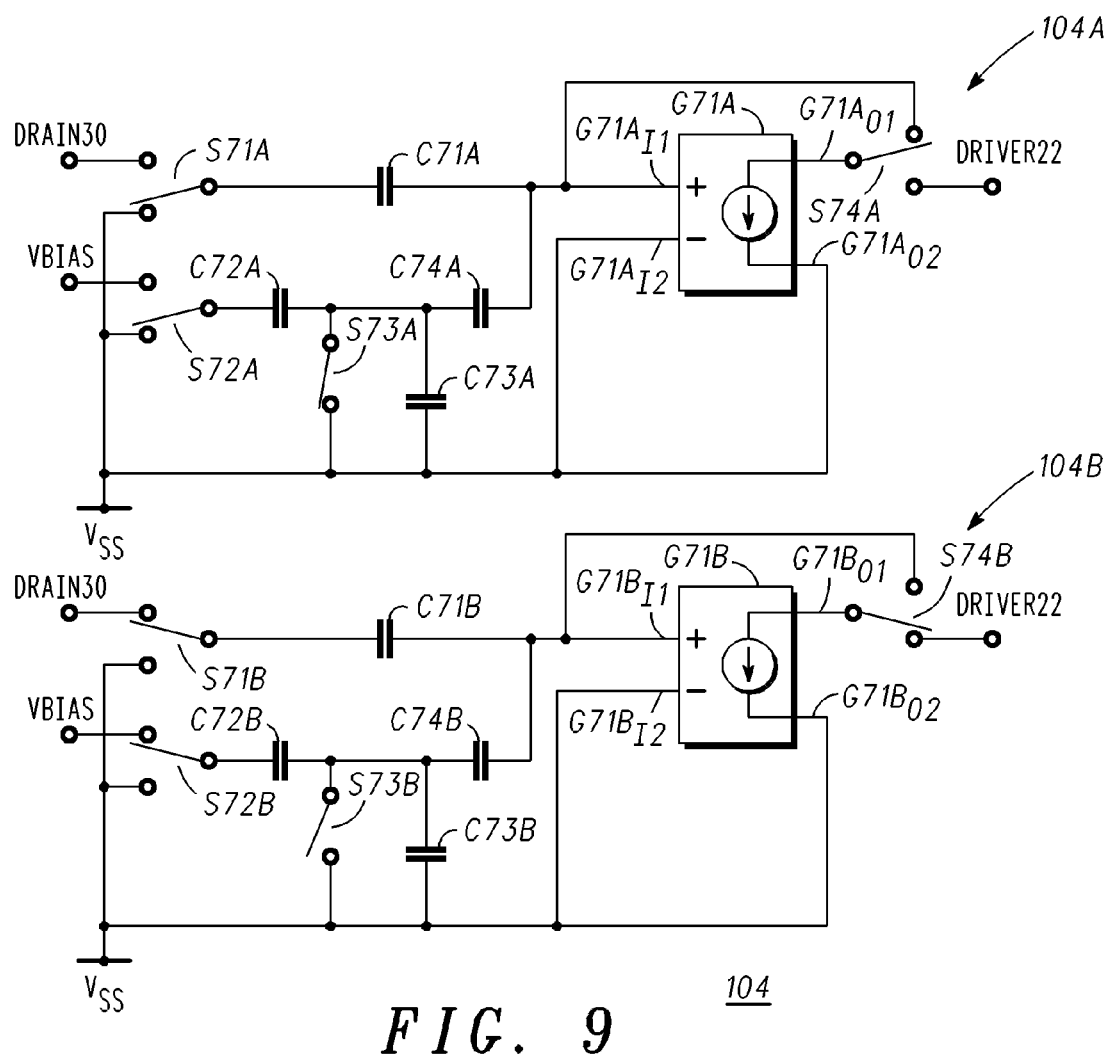
FIG. 9 is a schematic diagram of a zero-crossing detection circuit portion of the DC-DC converter of FIG. 8.

FIG. 9 is a schematic diagram of zero-crossing detector 104 in accordance with an embodiment of the present invention. Zero-crossing detector 104 comprises a sub-circuit 104A coupled in parallel with a sub-circuit 104B. Sub-circuit 104A comprises three three-terminal switches S71A, S72A, and S74A, a single two-terminal switch S73A, and a plurality of capacitors C71A, C72A, C73A, and C74A. Three-terminal switch S71A has a first terminal coupled to the drain of transistor 30, a second terminal coupled for receiving a source of operating potential such as, for example, $V_{SS}$, and a third terminal connected to one terminal of capacitor C71A. Showing the connection to DRAIN30 in FIG. 9 indicates the connection of the terminal to the drain of transistor 30. Three-terminal switch S72A has a first terminal coupled for receiving a bias voltage $V_{BIAS}$, a second terminal coupled for receiving a source of operating potential such as, for example, $V_{SS}$, and a third terminal connected to one terminal of capacitor C72A. The second terminal of capacitor C72A is coupled to source of operating potential $V_{SS}$ through a parallel combination of two-terminal switch S73A and capacitor C73A. The second terminal of capacitor C72A is also coupled to the second terminal of capacitor C71A through a capacitor C74A. A two-input transconductor G71A has an input $G71A_{I1}$ connected to the second terminal of capacitor C71A and to the second terminal of three-input switch S74A and an input $G71A_{I2}$ coupled for receiving a source of operating potential such as, for example, $V_{SS}$. The second terminal of three-terminal switch S74A is connected to driver circuit 22 (shown in FIG. 1) and the third terminal of switch S74A is connected to output $G71A_{O1}$ of transconductor G71A and an output $G71A_{O2}$ of transconductor G71A is coupled for receiving a source of operating potential such as, for example, $V_{SS}$. Showing the connection to DRIVER22 in FIG. 9 indicates the connection of the second terminal of three-terminal switch S74A.

Sub-circuit 104B comprises three three-terminal switches S71B, S72B, and S74B, a single two-terminal switch S73B, and a plurality of capacitors C71B, C72B, C73B, and C74B. Three-terminal switch S71B has a first terminal coupled to the drain of transistor 30, a second terminal coupled for receiving a source of operating potential such as, for example, $V_{SS}$, and a third terminal connected to one terminal of capacitor C71B. Showing the connection to DRAIN30 in FIG. 9 indicates the connection of the terminal to the drain of transistor 30. Three-terminal switch S72B has a first terminal coupled for receiving a bias voltage $V_{BIAS}$, a second terminal coupled for receiving a source of operating potential such as, for example, $V_{SS}$, and a third terminal connected to one terminal of capacitor C72B. The second terminal of capacitor C72B is coupled to source of operating potential $V_{SS}$ through a parallel combination of two-terminal switch S73B and capacitor C73B. The second terminal of capacitor C72B is also coupled to the second terminal of capacitor C71B through a capacitor C74B. A two-input transconductor G71B has an input $G71B_{I1}$ connected to the second terminal of capacitor C71B and to the second terminal of three-input switch S74B and an input $G71B_{I2}$ coupled for receiving a source of operating potential such as, for example, $V_{SS}$. The second terminal of three-terminal switch S74B is connected to driver circuit 22 (shown in FIG. 1) and the third terminal of switch S74B is connected to output $G71B_{O1}$ of transconductor G71B and an output $G71B_{O2}$ of transconductor G71B is coupled for receiving a source of operating potential such as, for example, $V_{SS}$. Showing the connection to DRIVER22 in FIG. 9 indicates the connection of the second terminal of three-terminal switch S74B.

In operation, sub-circuit 104A is switched to the offset correction mode while clock input signal CALA is high and sub-circuit 104B is switched to the offset correction mode while clock input signal CALB is high. When not in the offset correction mode, sub-circuits 104A and 104B operate in parallel, with each sub-circuit in an active mode. In the offset correction mode, switch S71A is configured to connect the first terminal of capacitor C71A to source of operating potential $V_{SS}$. Switches S72A and S73A are configured so that the terminals of capacitor C72A are connected to the same source of operating potential such as, for example, $V_{SS}$. In addition switch S73A connects the other terminal of capacitor C73A to the same source of operating potential as its first terminal and one terminal of capacitor C74A to a source of operating potential such as, for example, $V_{SS}$. Switch S74A is configured to connect output terminal $G71A_{O1}$ of transconductor G71A to input terminal $G71A_{I1}$. In this configuration, capacitors C71A and C74A are charged and coupled in a parallel configuration such that the voltage adjusts the output current of transconductor G71A to zero. Capacitors C72A and C73A are discharged.

In the active mode operation of sub-circuit 104B, output terminal $G71B_{O1}$ is connected to driver circuit 22 and input terminal $G71B_{I1}$ of transconductor G71B is coupled to the drain of transistor 30 via capacitor C71B. Output terminal $G71B_{O1}$ is also coupled to voltage $V_{BIAS}$ through a capacitor T-network formed by capacitors C72B, C73B, and C74B. Charge is transferred to capacitor C71B via this network, incrementing the voltage at input terminal $G71B_{I1}$. Preferably, capacitors C72B and C74B are small compared to capacitors C71B and C73B so that small voltage increments are produced at input terminal $G71B_{I1}$. The output voltage, which will be high while the voltage from the drain of transistor 30 is large and negative, will consequently fall to zero while the input voltage is still negative.

Because sub-circuits 104A and 104B are identical and connected in parallel, zero-crossing detector 204 operates indifferently with one or both being in the active mode. Either sub-circuit may therefore be switched, singly, into the offset correction mode without perturbing the function of the complete section.

By now it should be appreciated that a DC-DC converter and a method for compensating for offset errors in the DC-DC converter have been provided. The DC-DC converter includes an inductor coupled for receiving a voltage through a plurality of switches. The switches are controlled by a control circuit having two circuit paths that are configured to operate in parallel. This configuration provides for duplication of the control circuit paths so that at least one path is always active and responsive to the input signals. Including two paths allows for offset compensation to be applied to a system in the absence of a calibration interval. The circuit paths cooperate to provide offset cancellation of errors in elements o the circuit paths. This invention is suitable for use with charge control mode architectures and current control mode architectures.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for compensating errors in a DC-DC converter, comprising:
   providing a first signal path having at least one circuit element;
   providing a second signal path having at least one circuit element; and
   switching one of the first or second signal paths into an error correction mode to compensate for errors in the at least one circuit element in the first or second signal path that is in the error correction mode, wherein the other signal path of the first or second signal path is in a normal operating mode.

2. The method of claim 1, further including switching the one of the first or second signal paths into the error correction mode during a first part of a first clock period and switching the one of the first or second signal paths into the normal mode during a second part of the first clock period.

3. The method of claim 2, wherein the second part of the first clock period is a remaining portion of the first clock period.

4. The method of claim 3, wherein switching the one of the first or second signal paths into the normal mode further includes switching the one of the first or second signal paths into the normal mode during the whole of the second clock period.

5. The method of claim 4, further including selecting output signals from the at least one element of the first or second signal paths during the second clock period.

6. The method of claim 1, further including using a difference between a load voltage and a reference voltage to generate an output signal.

7. The method of claim 1, further including:
   integrating signals derived from input signals to the first signal path to produce a first integrated signal;
   integrating signals derived from input signals to the second signal path to produce a second integrated signal; and
   generating first and second comparator output signal components from the first and second integrated signals.

8. The method of claim 7, further including:
   generating a first control path signal by comparing the first comparator output signal with a charge indication signal that is indicative a charge supplied to a load during a concurrent clock period; and
   generating a second control path signal by comparing the second comparator output signal with the charge indication signal that is indicative the charge supplied to a load during the concurrent clock period.

9. The method of claim 8, further including using the first and second control path signals to generate an output voltage for communicating with a plurality of switches.

10. The method of claim 8, further including:
    discharging a first energy storage element at a beginning of each clock period; and
    charging the first energy storage element with a first current, wherein the first current is proportional to a second current that flows through a second energy storage element, and wherein the charge indication signal that is indicative of the charge supplied to a load during the concurrent clock period is a voltage developed across the first energy storage element.

11. The method of claim 10, further including providing a third current that is combined with the current that is proportional to the second current, wherein the third current inhibits development of an oscillatory mode.

12. A method of correcting for offset error in a DC-DC converter, comprising:
    generating a first signal in response to a reference signal and a converter output signal, the first signal comprising a first sub-signal and a second sub-signal;
    generating a second signal in response to the reference signal and the converter output signal, the second signal comprising a third sub-signal and a fourth sub-signal;
    correcting a first offset error in the first signal during a first period of a clock signal; and
    correcting a second offset error in the second signal during a second period of the clock signal, the first and second periods being different periods.

13. The method of claim 12, wherein the second period follows the first period.

14. The method of claim 12, wherein generating the first signal comprises:
    attenuating and filtering the reference signal and the converter output signal;
    comparing the attenuated and filtered reference signal with the attenuated and filtered converter output signal to generate the first sub-signal, wherein comparing the attenuated and filtered reference and converter output signals includes introducing a first offset error correction signal into the first sub-signal;
    comparing the first sub-signal with an internal reference voltage to generate the second sub-signal, wherein comparing the first sub-signal with the internal reference signal includes introducing a second offset error correction signal into the second sub-signal.

15. The method of claim 14, wherein generating the second signal comprises:
    attenuating and filtering the reference signal and the converter output signal;
    comparing the attenuated and filtered reference signal with the attenuated and filtered converter output signal to generate the third sub-signal, wherein comparing the attenuated and filtered reference and converter output signals includes introducing a third offset error correction signal into the third sub-signal; and
    comparing the third sub-signal with the internal reference voltage to generate the fourth sub-signal, wherein comparing the third sub-signal with the internal reference signal includes introducing a fourth offset error correction signal into the fourth sub-signal.

16. The method of claim 15, further including:
    selecting one of the first signal or the second signal to generate a selected signal;
    generating a driver signal from the selected signal;
    using the driver signal to create an image current; and
    using the image current to generate the internal reference signal.

17. The method of claim 16, wherein using the driver signal to create the image current includes turning on first and second transistors, wherein the image current is an image of the current flowing through the first transistor.

18. A DC-DC converter, comprising:
    a control circuit having a plurality of inputs and a plurality of outputs, wherein the control circuit comprises:
      a first circuit path having first and second inputs and an output; and
      a second circuit path having first and second inputs and an output, wherein the first and second circuit paths cooperate to provide offset cancellation of errors in elements of the first and second circuit paths; and
    a switching network coupled to the control circuit.

19. The DC-DC converter of claim 18, further including a clock generator coupled to the control circuit and to the switching network.

20. The DC-DC converter of claim 18, wherein a portion of the elements in the first circuit path comprises switched capacitors.

21. The DC-DC converter of claim 19, wherein a portion of the elements in the second circuit path comprises switched capacitors.

22. The DC-DC converter of claim 18, wherein a portion of the elements in the first circuit path operate in an error correction mode during a first portion of a first clock period.

23. The DC-DC converter of claim 22, wherein a portion of the elements in the first circuit path operate in a normal mode during a second portion of the first clock period.

24. The DC-DC converter of claim 18, wherein the first circuit path comprises a first comparator that produces an output responsive to a difference between a portion of a load voltage and a reference voltage.

25. The DC-DC converter of claim 24, wherein the second circuit path comprises a second comparator that produces an output responsive to a difference between a portion of a load voltage and a reference voltage.

26. The DC-DC converter of claim 25, wherein the first and second comparators include a filter means for doting the first and second circuit paths, respectively.

27. The DC-DC converter of claim 26, wherein the filter means includes an integrator for providing an output signal component common to the first and second circuit paths.

28. The DC-DC converter of claim 25, wherein the first circuit path further includes a third comparator coupled to the first comparator and the second circuit path further includes a fourth comparator coupled to the second comparator.

29. The DC-DC converter of claim 18, further including a capacitor coupled to the switching network.

* * * * *